US012124202B2

(12) United States Patent
Yoshioka

(10) Patent No.: US 12,124,202 B2
(45) Date of Patent: Oct. 22, 2024

(54) IMAGE FORMING APPARATUS

(71) Applicant: FUJIFILM Business Innovation Corp., Tokyo (JP)

(72) Inventor: Tomoaki Yoshioka, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/971,658

(22) Filed: Oct. 24, 2022

(65) Prior Publication Data

US 2023/0418201 A1 Dec. 28, 2023

(30) Foreign Application Priority Data

Jun. 28, 2022 (JP) ................................ 2022-103391

(51) Int. Cl.
*G03G 15/00* (2006.01)

(52) U.S. Cl.
CPC ................................ *G03G 15/6529* (2013.01)

(58) Field of Classification Search
CPC .... B41F 17/001; B41F 17/002; B41F 17/003; B41F 17/005; B41F 17/16; B41F 17/18
See application file for complete search history.

(56) References Cited

U.S. PATENT DOCUMENTS 5,367,953 A * 11/1994 Yamashita ................ B41F 1/34 101/163
6,019,526 A * 2/2000 Herbert .................... B41J 11/20 400/58
6,146,805 A 11/2000 Yoshimura et al.
6,276,266 B1 * 8/2001 Dietz .................... B41F 17/001 101/DIG. 40
6,447,181 B1 * 9/2002 Hagstrom ................ B41J 2/325 400/208
8,879,957 B2 11/2014 Hanson et al.
2007/0180457 A1 * 8/2007 Makino ................ G11B 17/056 720/613
2008/0257764 A1 * 10/2008 Crouan .............. G11B 33/0422 206/308.1
2008/0285189 A1 * 11/2008 Yang .................. G11B 33/1493 361/56
2010/0295897 A1 * 11/2010 Naruse ................... B41J 19/207 347/37
2012/0227599 A1 * 9/2012 Fraser .................. H05K 3/4679 101/248
2012/0272463 A1 * 11/2012 Crisp ......................... C14B 1/56 12/103

(Continued)

FOREIGN PATENT DOCUMENTS

| | | |
|---|---|---|
| JP | 3292954 | 6/2002 |
| JP | 6900650 | 7/2021 |

OTHER PUBLICATIONS

"Search Report of Europe Counterpart Application", issued on Nov. 24, 2023, pp. 1-8.

*Primary Examiner* — David H Banh
(74) *Attorney, Agent, or Firm* — JCIPRNET

(57) ABSTRACT

An image forming apparatus includes a transfer unit that transfers an image onto an object by making contact with the object; an attachment table to which the object is attached and that changes a height thereof in accordance with force by which the transfer unit makes contact with the object; and a transport unit that transports the attachment table to which the object has been attached along a transport path.

8 Claims, 15 Drawing Sheets

(56) References Cited

U.S. PATENT DOCUMENTS

| | | | | |
|---|---|---|---|---|
| 2013/0075033 | A1 | 3/2013 | Chillscyzn et al. | |
| 2013/0139189 | A1* | 5/2013 | Yamasaki | G11B 17/056<br>720/613 |
| 2017/0277084 | A1 | 9/2017 | Tokuyama | |
| 2020/0223236 | A1* | 7/2020 | Martinez | B41F 15/18 |
| 2020/0353745 | A1* | 11/2020 | Kitazawa | B41F 3/22 |

* cited by examiner

IMAGE FORMING APPARATUS

CROSS-REFERENCE TO RELATED APPLICATIONS

This application is based on and claims priority under 35 USC 119 from Japanese Patent Application No. 2022-103391 filed Jun. 28, 2022.

BACKGROUND

(i) Technical Field

The present disclosure relates to an image forming apparatus.

(ii) Related Art

In recent years, there are cases where an image is printed on any of media having various thicknesses and shapes such as metal, glass, and tile.

Japanese Patent No. 3292954 discloses a printer that forms an image on a disc while transporting the disc placed on a transport table together with the transport table.

SUMMARY

In a case where an image is formed on any of media having various thicknesses and shapes by a method of transferring an image by bringing a transfer unit into contact with a medium, print quality may undesirably decrease, for example, due to misregistration of the medium that occurs due to a shock caused by the contact of the transfer unit with the medium.

Aspects of non-limiting embodiments of the present disclosure relate to a technique of keeping a decrease in print quality small in a case where an image is printed on any of media having various thicknesses and shapes, as compared with a configuration in which a medium directly placed on a transport unit such as a transport belt is transported.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an image forming apparatus including a transfer unit that transfers an image onto an object by making contact with the object; an attachment table to which the object is attached and that changes a height thereof in accordance with force by which the transfer unit makes contact with the object; and a transport unit that transports the attachment table to which the object has been attached along a transport path.

BRIEF DESCRIPTION OF THE DRAWINGS

An exemplary embodiment of the present disclosure will be described in detail based on the following figures, wherein:

FIG. 3A illustrates how the height is controlled, FIG. 3B illustrates a state where an attachment table has retreated to a preparation position after the height control, and FIG. 3C illustrates a state where the transfer unit starts transfer of an image;

FIG. 4A illustrates a state where openings of the fixing unit are closed, and FIG. 4B illustrates a state where the openings of the fixing unit are opened;

FIG. 5A illustrates a first configuration example, and FIG. 5B illustrates a second configuration example;

FIG. 6A illustrates a state at start of the transfer, FIG. 6 illustrates a state during the transfer, and FIG. 6C illustrates a state at end of the transfer;

FIG. 7A is a side view, and FIG. 7B is a plan view;

FIG. 8A illustrates a state where the jig and the intermediate transfer belt are in contact with each other, and FIG. 8B illustrates a state where the medium and the intermediate transfer belt are in contact with each other;

FIG. 9A is a side view, and FIG. 9B is a plan view;

FIG. 10A is a side view, and FIG. 10B is a plan view;

FIG. 11A is a side view, and FIG. 11B is a plan view;

FIG. 12A illustrates a state where the jig and the intermediate transfer belt are in contact with each other, and FIG. 12B illustrates a state where the medium and the intermediate transfer belt are in contact with each other;

FIG. 13A is a side view, and FIG. 13B is a plan view;

FIG. 14A is a side view, and FIG. 14B is a plan view; FIG. 15A is a side view, and FIG. 15B is a plan view.

DETAILED DESCRIPTION

An exemplary embodiment of the present disclosure is described in detail below with reference to the attached drawings. An image forming apparatus according to the present exemplary embodiment is an image forming apparatus employing digital printing. Although an electrophotographic system, an inkjet system, and the like are known as digital printing systems, the electrophotographic system is assumed in the present exemplary embodiment. In the electrophotographic system, a transfer unit and a medium are brought into contact with each other when an image is transferred onto the medium. Furthermore, in the present exemplary embodiment, any of media having various thicknesses and shapes such as metal, glass, and tile is assumed as an object on which an image is to be printed.

Apparatus Configuration

Figure 1:
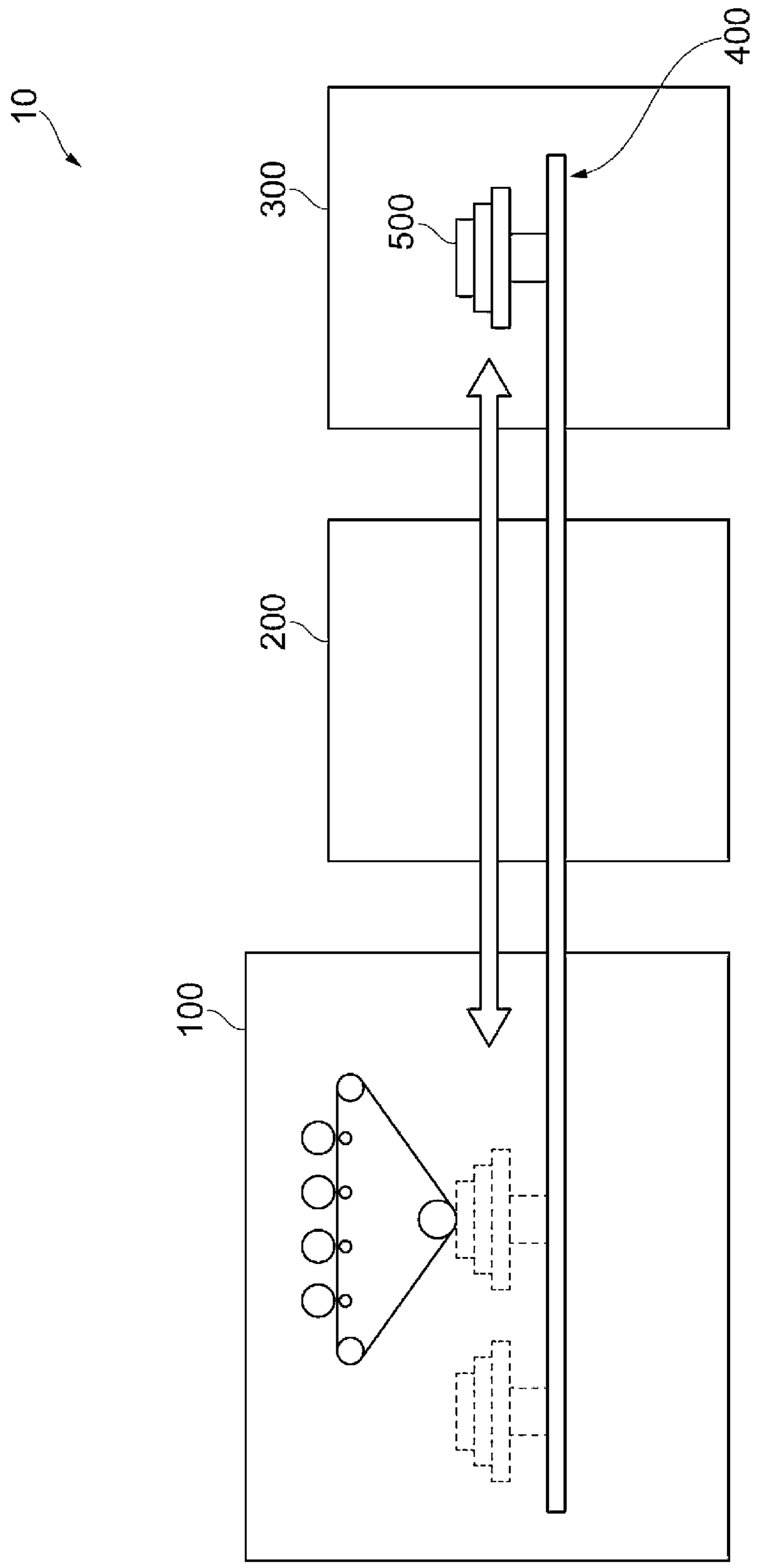
FIG. 1 illustrates a configuration of an image forming apparatus to which the present exemplary embodiment is applied.

FIG. 1 illustrates a configuration of an image forming apparatus to which the present exemplary embodiment is applied. The image forming apparatus 10 includes a transfer unit 100, a fixing unit 200, a medium attaching detaching unit 300, and a transport mechanism 400. Furthermore, the image forming apparatus 10 includes a controller (not illustrated) having one or more processors, which are computing units, a memory serving as a working region in data processing, and a storage device that holds a program and data. The controller may be a single controller that controls operation of the whole image forming apparatus 10 or may be controllers individually provided in units such as the transfer unit 100, the fixing unit 200, and the transport mechanism 400.

The transfer unit 100 is a unit that transfers an image formed with particles such as toner onto a medium 500. The fixing unit 200 is a unit that fixes, on a surface of the medium 500, an image transferred by the transfer unit 100 by heating the medium 500. The medium attaching detaching unit 300 is a unit in which a user of the image forming apparatus 10 attaches the medium 500 to an attachment table (described later) provided in the transport mechanism 400. The transport mechanism 400 is provided across the transfer unit 100, the fixing unit 200, and the medium attaching detaching unit 300, and transports the medium 500 on which an image is to be printed to the units 100, 200, and 300 as indicated by the arrow in FIG. 1.

The medium attaching detaching unit 300 is a housing having an opening through which the medium 500 can be carried into and out of the medium attaching detaching unit 300. In the medium attaching detaching unit 300, one end portion of a transport rail 410 that constitutes the transport mechanism 400 is located, and a transport start position and a transport end position are set. This will be described in detail later. In the present exemplary embodiment, the transport start position and the transport end position are set at the same position. In an initial state, an attachment table 420 that constitutes the transport mechanism 400 is disposed at the position of the transport rail 410 set as the transport start position and the transport end position. The user attaches a jig 423 holding the medium 500 to the attachment table 420 by putting the jig 423 into the housing of the medium attaching detaching unit 300 through the opening, thereby making the medium 500 transportable by the transport mechanism 400. After an image is transferred onto the medium 500 by the transfer unit 100 and fixed by the fixing unit 200, the attachment table 420 on which the medium 500 is placed moves along the transport rail 410 and reaches the transport end position. In this state, the user detaches the jig 423 holding the medium 500 from the attachment table 420 and takes the jig 423 out through the opening of the housing of the medium attaching detaching unit 300.

Configuration of Transfer Unit 100

Figure 2:
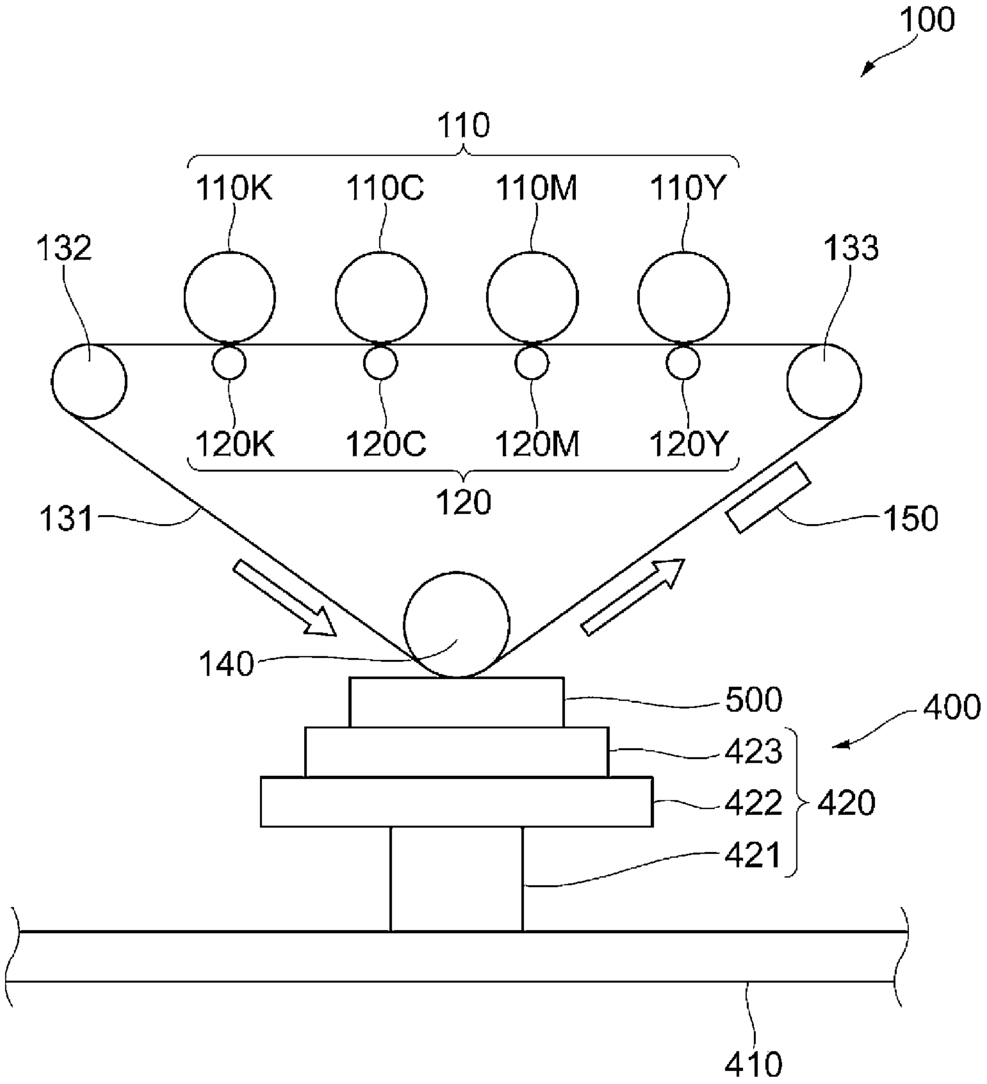
FIG. 2 illustrates a configuration of a transfer unit.

FIG. 2 illustrates a configuration of the transfer unit 100. The transfer unit 100 forms an image with charged particles and transfers the image onto the medium 500 by generating an electric field. The transfer unit 100 includes a developing device 110, a first transfer roll 120, and an intermediate transfer belt 131. The intermediate transfer belt 131 is tensioned between the developing device 110 and a position where an image is transferred onto the medium 500 by rollers 132 and 133 and a backup roll 140. Furthermore, the transfer unit 100 includes a cleaning device 150 for removing particles attached to the intermediate transfer belt 131.

The developing device 110 is a unit that forms, on a photoreceptor, an electrostatic latent image of an image to be transferred and develops the image by attaching charged particles to the electrostatic latent image on the photoreceptor. As the developing device 110, an existing device used in an electrophotographic image forming apparatus can be used. FIG. 2 illustrates an example of a configuration employed in a case where color image formation processing is performed by using four colors, that is, three colors: yellow, magenta, and cyan, and an additional one color: black. The developing device 110 is provided for each of these colors, and the developing devices 110 for yellow, magenta, cyan, and black are given suffixes Y, M, C, and K indicative of the colors in FIG. 2. In the following description, the suffixes are omitted in a case where the colors of the developing devices 110 need not be distinguished although the suffixes Y, M, C, and K are given to the reference signs in a case where the colors are distinguished.

The first transfer roll 120 is a unit used to transfer (first transfer) an image formed by the developing device 110 onto the intermediate transfer belt 131. The first transfer roll 120 is disposed so as to face the photoreceptor of the developing device 110, and the intermediate transfer belt 131 is located between the developing device 110 and the first transfer roll 120. The first transfer roll 120 is provided corresponding to each of the developing devices 110Y, 110M, 110C, and 110K. In FIG. 2, the first transfer rolls 120 corresponding to the developing devices 110Y, 110M, 110C, and 110K of the respective colors are given suffixes Y, M, C, and K indicative of the colors. In the following description, the suffixes are omitted in a case where the colors of the first transfer rolls 120 need not be distinguished although the suffixes Y, M, C, and K are given to the reference signs in a case where the colors are distinguished.

The intermediate transfer belt 131, the rollers 132 and 133, and the backup roll 140 are units used to transfer an image formed by the developing device 110 onto the medium 500. As illustrated in FIG. 2, the intermediate transfer belt 131 rotates in a direction indicated by the arrows in FIG. 2 (a counterclockwise direction in the example illustrated in FIG. 2) while being suspended around the rollers 132 and 133 and the backup roll 140 in a tensioned state. For example, one or both of the rollers 132 and 133 is(are) a roller(s) that is(are) driven to rotate, and the intermediate transfer belt 131 is pulled by rotation of this (these) roller(s). In this way, the intermediate transfer belt 131 rotates.

An outer surface of the intermediate transfer belt 131 in the example of the configuration in FIG. 2 is a surface (hereinafter referred to as a "transfer surface") on which an image is held. An image is transferred from the photoreceptor of the developing device 110 onto the transfer surface of the intermediate transfer belt 131 when the intermediate transfer belt 131 passes between the developing device 110 and the first transfer roll 120. In the example of the configuration illustrated in FIG. 2, images of the respective colors: yellow (Y), magenta (M), cyan (C), and black (K) are superimposed on the transfer surface by the developing devices 110Y, 110M, 110C, and 110K and the first transfer rolls 120Y, 120M, 120C, and 120K, and thus a multi-color image is formed.

The backup roll 140 transfers (second transfer) the image onto the medium 500 by bringing the transfer surface of the intermediate transfer belt 131 into contact with the medium 500. A predetermined voltage is applied to the backup roll 140 when the image is transferred. This generates an electric field (hereinafter referred to as a "transfer electric field") in a range including the backup roll 140 and the medium 500, thereby transferring the image formed with charged particles from the intermediate transfer belt 131 onto the medium 500. As described above, to transfer an image from the intermediate transfer belt 131 onto the medium 500, an electric current need to flow from the backup roll 140 to the medium 500 through the intermediate transfer belt 131. In a case where the medium 500 is a conductor such as a metal, an electric current flows through the medium 500 itself, and therefore an image is transferred onto a surface of the medium 500 by generating a transfer electric field. On the other hand, in a case where the medium 500 is not a conductor, no electric current flows through the medium, and therefore an image cannot be transferred in this state. In view of this, in a case where the medium 500 is not a conductor, an electric current is passed through the medium 500 by taking a measure such as forming a layer made of an electrically conductive material (hereinafter referred to as an "electrically conductive layer") in advance in at least a region on the surface of the medium 500 where an image is to be formed.

A procedure of transfer of an image by the intermediate transfer belt 131 is described. When the intermediate transfer belt 131 rotates, images of the respective colors: yellow (Y), magenta (M), cyan (C), and black (K) are sequentially superimposed on the transfer surface (outer surface in FIG. 2) of the intermediate transfer belt 131 by the developing devices 110Y, 110M, 110C, and 110K and the first transfer rolls 120Y, 120M, 120C, and 120K, and thus a multi-color image is formed. When the intermediate transfer belt 131 further rotates, the image formed on the transfer surface of the intermediate transfer belt 131 reaches a position (hereinafter referred to as a "transfer position") where the intermediate transfer belt 131 makes contact with the medium 500. As described above, a voltage is applied to the backup roll 140. This generates a transfer electric field, thereby transferring the image from the intermediate transfer belt 131 onto the medium 500.

The cleaning device 150 is a unit that removes particles attached to the transfer surface of the intermediate transfer belt 131. The cleaning device 150 is provided at a position on a downstream side relative to the transfer position and an upstream side relative to the developing device 110Y and the first transfer roll 120Y in a direction in which the intermediate transfer belt 131 rotates. With this configuration, particles remaining on the transfer surface of the intermediate transfer belt 131 are removed by the cleaning device 150 after the image is transferred from the intermediate transfer belt 131 onto the medium 500. In a next operation cycle, an image is newly transferred (first transfer) onto the transfer surface from which particles have been removed.

Configuration of Transport Mechanism 400 and Attachment Structure for Attachment of Medium 500

An attachment structure for attachment of the medium 500 is described. In the present exemplary embodiment, it is assumed that the medium 500 can have various thicknesses and shapes. In a case where the medium 500 directly placed on a transport path constituted by a belt and a roller is transported, it is difficult to appropriately bring the intermediate transfer belt 131 into contact with the medium 500 since a height of the medium 500 relative to the transport path varies at the transfer position of the transfer unit 100 in a case where a thickness and a shape of the medium 500 vary. Specifically, such a situation can occur in which the medium 500 does not make contact with the intermediate transfer belt 131 in a case where the height of the medium 500 is low, and a strong shock is caused when the medium 500 makes contact with the intermediate transfer belt 131 in a case where the height of the medium 500 is high. In view of this, the transport mechanism 400 according to the present exemplary embodiment has the attachment table 420 having a height controller and transports the medium 500 placed on the attachment table 420 together with the attachment table 420.

The transport mechanism 400 includes the transport rail 410 that specifies a transport path for the medium 500 and the attachment table 420 that moves on the transport rail 410 (see FIG. 2). The attachment table 420 includes a leg part 421 attached to the transport rail 410 and a table part 422 on which the medium 500 is to be placed. Furthermore, the jig 423 that holds the medium 500 on the table part 422 is attached to the table part 422. The transport mechanism 400 is an example of a transport unit.

In the example of the configuration illustrated in FIG. 1, the transport rail 410 is disposed so as to extend from the medium attaching detaching unit 300 to the transfer unit 100 while passing the fixing unit 200. An end portion of the transport rail 410 on a medium attaching detaching unit 300 side is the transport start position and the transport end position. The attachment table 420 is transported leftward in FIG. 1 from the transport start position of the medium attaching detaching unit 300, and an image is transferred onto the medium 500 in the transfer unit 100. After the image transfer, the attachment table 420 is transported rightward in FIG. 1, and reaches the transport end position of the medium attaching detaching unit 300 after the image is fixed on the medium 500 in the fixing unit 200.

The leg part 421 is attached to the transport rail 410 and moves on the transport rail 410. The leg part 421 is an example of a mobile part. A mechanism for moving the leg part 421 on the transport rail 410 is not limited in particular. For example, the leg part 421 may be provided with a driving device so as to be movable on its own or the transport rail 410 may be provided with a unit that pulls the leg part 421. Furthermore, the leg part 421 has a height controller that controls a height of the table part 422. A configuration of the height controller is not limited in particular. For example, the table part 422 may be moved up and down by rack and pinion and a drive motor. Alternatively, the height of the table part 422 may be controlled by manually operating a gear that is linked with the height of the table part 422. Furthermore, various methods can be used as an operation method for controlling the height. For example, an input interface for input to a controller of the drive motor may be prepared, and an operator of the image forming apparatus 10 may manually input and set height data by using the input interface. Alternatively, the height of the medium 500 attached to the attachment table 420 may be automatically detected by using a sensor, and the drive motor may be controlled so that the medium 500 is located at an appropriate height.

The table part 422 is a table that is attached to the leg part 421 and on which the medium 500 is placed with the jig 423 interposed therebetween. The table part 422 is provided with a fastener (not illustrated) for positioning the jig 423. Any jigs 423 compatible with this fastener can be positioned and attached to the table part 422 irrespective of shapes thereof.

Furthermore, the table part 422 is attached so as to float up and sink down with respect to the leg part 421 in accordance with a pressure applied from an upper side. The configuration in which the table part 422 floats up and sinks down is, for example, realized by interposing an elastic body at a portion where the table part 422 and the leg part 421 are joined. By employing such a configuration, a shock caused when the medium 500 held by the jig 423 attached to the table part 422 makes contact with the intermediate transfer belt 131 of the transfer unit 100 is lessened.

The jig 423 is a device for holding the medium 500 and is attached to the table part 422. A portion of the jig 423 attached to the table part 422 has a shape and a structure compatible with the fastener of the table part 422. Furthermore, the jig 423 has a shape for holding the medium 500. Therefore, media 500 having various shapes and sizes can be placed on the attachment table 420 by preparing jigs 423 compatible with the shapes and sizes of the media 500.

Preliminary Operation of Image Formation

The image forming apparatus 10 according to the present exemplary embodiment has the transport mechanism 400 configured as above and therefore can print an image on any of the media 500 having various shapes and sizes. However, before start of image transfer operation, the height of the table part 422 is controlled in order to prevent a strong shock from being caused by contact of the medium 500 with the intermediate transfer belt 131 of the transfer unit 100 or prevent failure to bring the medium 500 into contact with the intermediate transfer belt 131 when an image is transferred onto the medium 500.

Figure 3A:
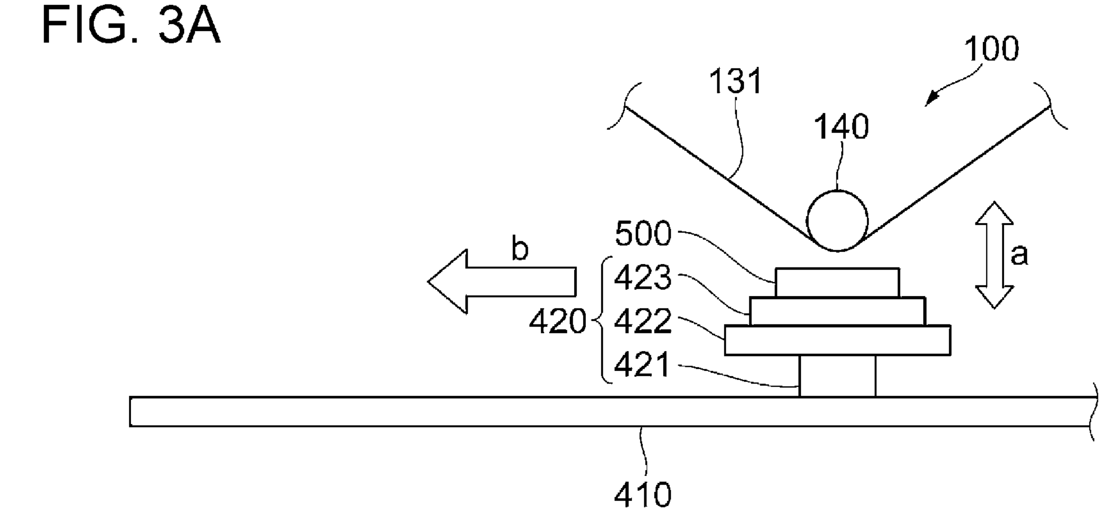
FIGS. 3A to 3C illustrate operation of a transport mechanism before start of image formation by the transfer unit.
Figure 3B:
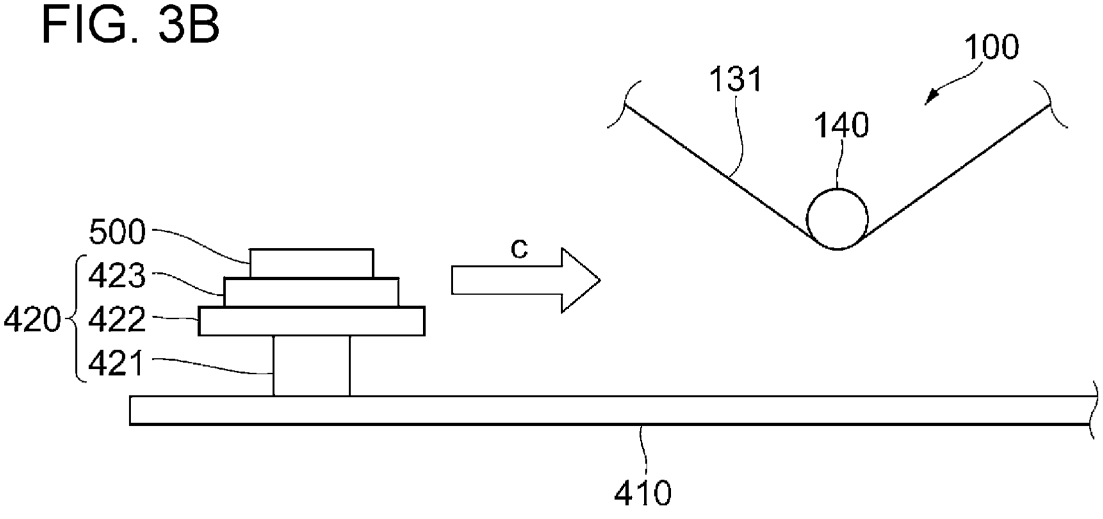
Figure 3C:
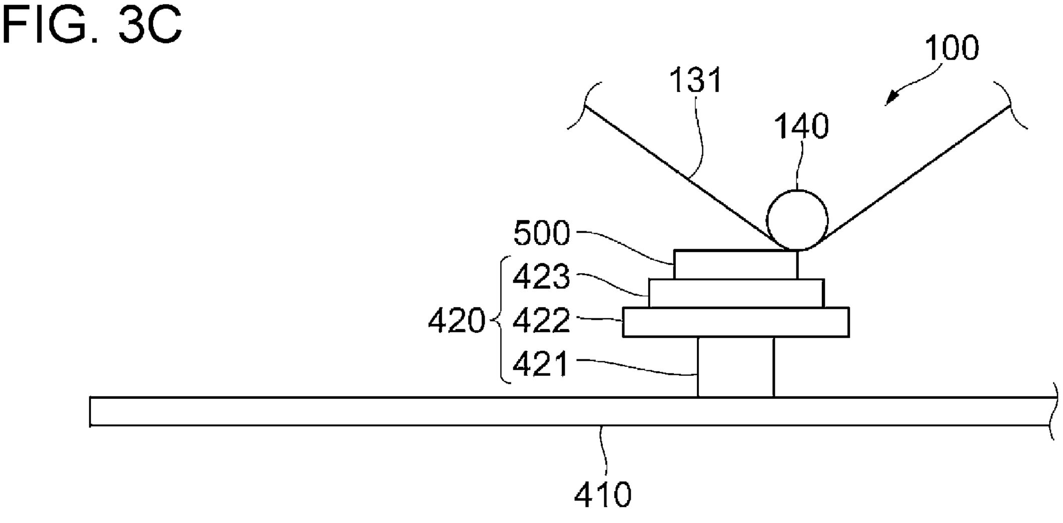

FIGS. 3A to 3C illustrate operation of the transport mechanism 400 before start of image formation by the transfer unit 100. FIG. 3A illustrates how the height is controlled, FIG. 3B illustrates a state where the attachment table 420 has retreated to a preparation position after the height control, and FIG. 3C illustrates a state where the transfer unit 100 starts transfer of an image.

In a case where an image is formed on the medium 500, first, the medium 500 held by the jig 423 is placed on the attachment table 420 at the transport start position of the medium attaching detaching unit 300. Then, the medium 500 is lowered to a height at which the medium 500 does not make contact with the intermediate transfer belt 131 of the transfer unit 100 by the height controller of the attachment table 420, and then the attachment table 420 on which the medium 500 is placed is moved to a position below the transfer position of the transfer unit 100.

Next, the height of the attachment table 420 is controlled so that the medium 500 makes contact with the intermediate transfer belt 131 with a strength appropriate for transfer of the image at the transfer position (arrow a in FIG. 3A). When the height is controlled, information on an appropriate height (hereinafter referred to as a "transfer execution height") thus obtained is held, for example, in the memory of the controller. Then, the attachment table 420 is lowered to a height where the medium 500 does not make contact with the intermediate transfer belt 131 and moves to the preparation position for transfer operation (arrow b in FIG. 3A).

When the attachment table 420 moves to the preparation position, the height of the attachment table 420 is adjusted to the transfer execution height on the basis of the information obtained in the height control. Then, the attachment table 420 moves to the transfer position (arrow c in FIG. 3B), and transfer of the image starts when the medium 500 makes contact with the intermediate transfer belt 131 at the transfer position (FIG. 3C).

Configuration of Fixing Unit 200

After the image is transferred onto the medium 500 in the transfer unit 100, the image is fixed in the fixing unit 200. In the present exemplary embodiment, an image is formed on any of the media 500 having various thicknesses and shapes, and therefore the fixing processing is performed by a non-contact-type device. The fixing unit 200 melts particles forming the image transferred onto the medium 500 by heating the particles and thereby fixes the particles on the surface of the medium 500.

Figure 4A:
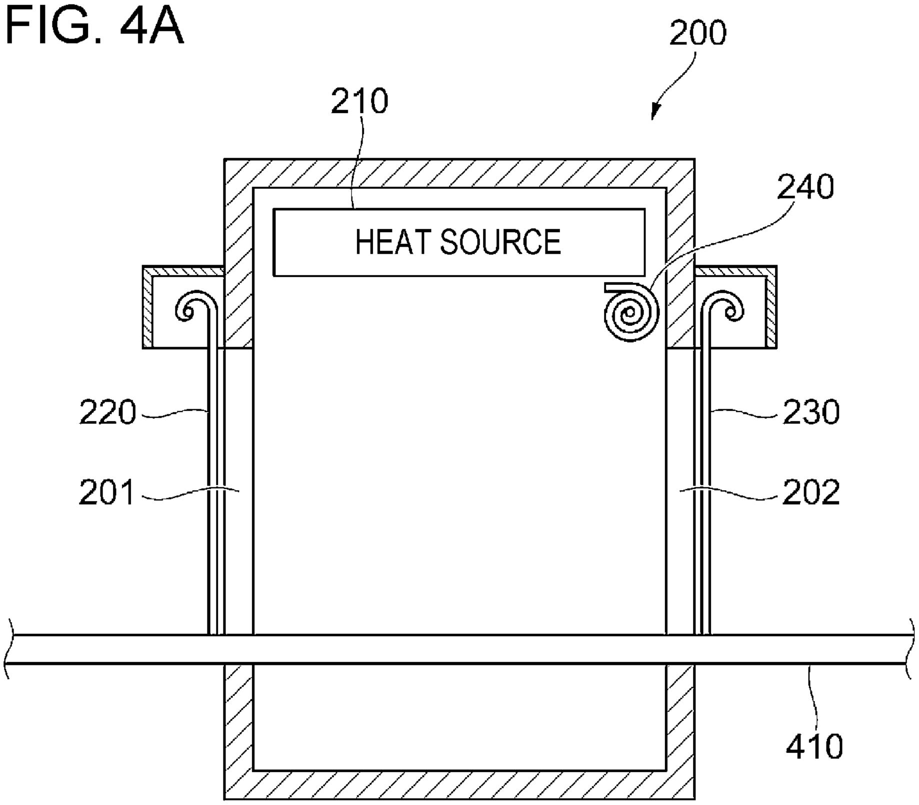
FIGS. 4A and 4B illustrate a configuration and operation of a fixing unit.
Figure 4B:
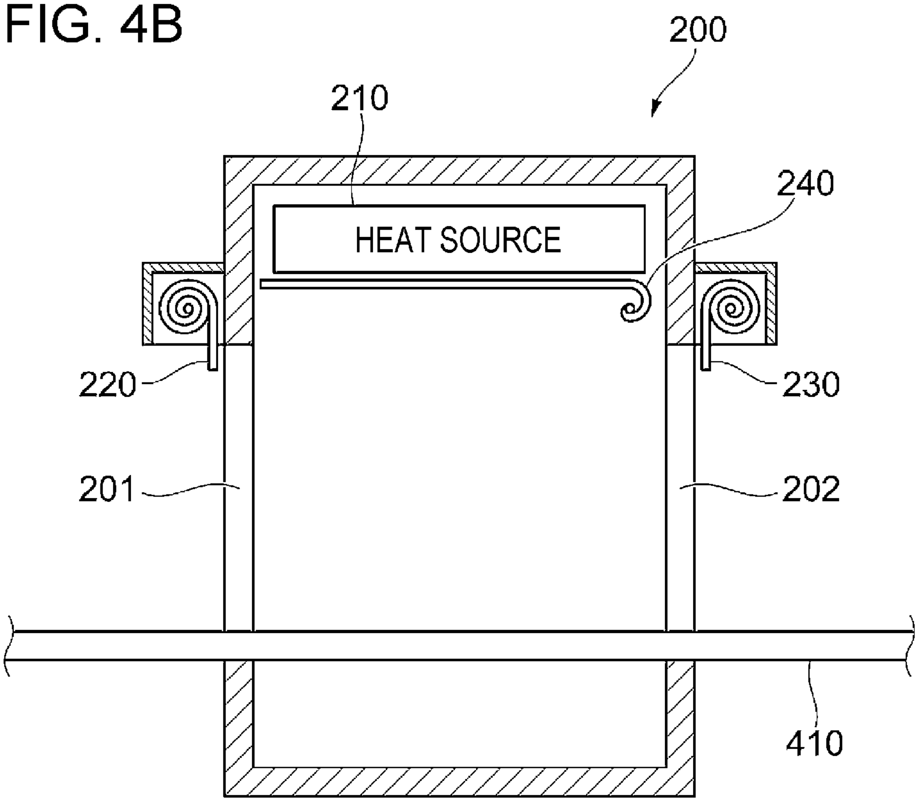

FIGS. 4A and 4B illustrate a configuration and operation of the fixing unit 200. FIG. 4A illustrates a state where openings of the fixing unit 200 are closed, and FIG. 4B illustrates a state where the openings of the fixing unit 200 are opened. The fixing unit 200 includes a carry-in opening 201, which is an opening through which the medium 500 is carried into the fixing unit 200, and a carry-out opening 202, which is an opening through which the medium 500 is carried out of the fixing unit 200. Furthermore, the carry-in opening 201 and the carry-out opening 202 of the fixing unit 200 according to the present exemplary embodiment are provided with an opening and closing member and are configured to be opened when the medium 500 is carried into or out of the fixing unit 200 and be closed when the fixing processing is performed.

In this example, an opening on a side where the medium 500 is carried into the fixing unit 200 when image fixing processing is performed by the fixing unit 200 is the carry-in opening 201, and an opening on a side where the medium 500 is carried out of the fixing unit 200 is the carry-out opening 202. In other words, an opening in a side surface that faces the transfer unit 100 is the carry-in opening 201, and an opening in a side surface that faces the medium attaching detaching unit 300 is the carry-out opening 202. In the example illustrated in FIGS. 4A and 4B, an opening on a left side is the carry-in opening 201, and an opening on a right side is the carry-out opening 202. In the image forming apparatus 10 according to the present exemplary embodiment, the medium 500 passes through the fixing unit 200 when the medium 500 is transported from the transport start position of the medium attaching detaching unit 300 to the transfer unit 100. In this case, the medium 500 enters the fixing unit 200 through the carry-out opening 202 and exits the fixing unit 200 through the carry-in opening 201, in a manner opposite to the case where the fixing processing is performed. However, in the present exemplary embodiment, the carry-in opening 201 and the carry-out opening 202 are set as described above on the basis of operation performed when the fixing processing is performed in the fixing unit 200.

The fixing unit 200 includes a heat source 210 for thermal fixation. The heat source 210 can be, for example, any of various existing heat sources such as a halogen lamp, a ceramic heater, and an infrared lamp. Instead of the heat source 210, a device that heats particles forming the image by emitting infrared laser may be used. The fixing unit 200 according to the present exemplary embodiment is provided with a member that can cover the heat source 210, and is configured so that the heat source 210 is exposed when the fixing processing is performed.

In the example illustrated in FIGS. 4A and 4B, roll-up shutters 220 and 230 are provided as the opening and closing members of the carry-in opening 201 and the carry-out opening 202. The shutters 220 and 230 are closed (see FIG. 4A) except when the medium 500 is carried into and out of the fixing unit 200 and thereby prevent a decrease in internal temperature. The shutter 220 of the carry-in opening 201 opens when the medium 500 is carried into the fixing unit 200, and the shutter 230 of the carry-out opening 202 opens when the medium 500 is carried out of the fixing unit 200 (see FIG. 4B).

In the example illustrated in FIGS. 4A and 4B, a roll-up shutter 240 is provided as the covering member that covers the heat source 210. The shutter 240 closes in a case where the shutter 220 of the carry-in opening 201 and/or the shutter 230 of the carry-out opening 202 open(s) (see FIG. 4B). This may keep a decrease in temperature of the heat source 210 small even in a case where the carry-in opening 201 and/or the carry-out opening 202 open(s) and the internal temperature decreases.

In the example illustrated in FIG. 4B, a state where both of the shutter 220 of the carry-in opening 201 and the shutter 230 of the carry-out opening 202 are opened is illustrated for convenience of description. In actual operation, the shutter 230 of the carry-out opening 202 remains closed when the medium 500 is carried into the fixing unit 200, and the shutter 220 of the carry-in opening 201 remains closed when the medium 500 is carried out of the fixing unit 200. This keeps a decrease in internal temperature small.

The shutters 220, 230, and 240 illustrated in FIGS. 4A and 4B are an example of the opening and closing members of the carry-in opening 201 and the carry-out opening 202 and the covering member of the heat source 210. The opening and closing members and covering member are not limited to the above configuration, as long as the opening and closing members and covering member keep a decrease in internal temperature of the fixing unit 200 and temperature of the heat source 210 small. For example, an opening and closing door may be provided instead of the shutters 220, 230, and 240 illustrated in FIGS. 4A and 4B. As the opening and closing member of the carry-out opening 202 through which the medium 500 passes after the fixing processing is finished, a curtain made of a heat insulating material or air curtain may be used to prevent leakage of internal air.

Configuration of Attachment Table 420

Next, a configuration of the attachment table 420 is described in more detail. As described with reference to FIG. 2, the image forming apparatus 10 according to the present exemplary embodiment transfers an image formed on the intermediate transfer belt 131 of the transfer unit 100 onto the medium 500 by bringing the intermediate transfer belt 131 into contact with the medium 500. Furthermore, as described above, the elastic body is interposed between the leg part 421 and the table part 422 of the attachment table 420 so that the table part 422 floats up and sinks down, and thereby a shock caused by contact of the medium 500 with the intermediate transfer belt 131 is lessened. In other words, the attachment table 420 changes a height thereof in accordance with force by which the intermediate transfer belt 131 makes contact with the medium 500. This configuration for changing the height of the table part 422 is described by giving a specific example.

Figure 5A:
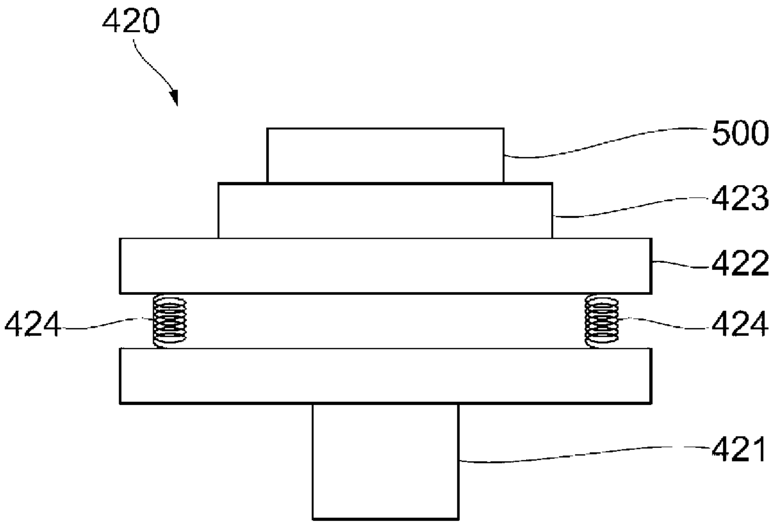
FIGS. 5A and 5B illustrate a structure of the attachment table.
Figure 5B:
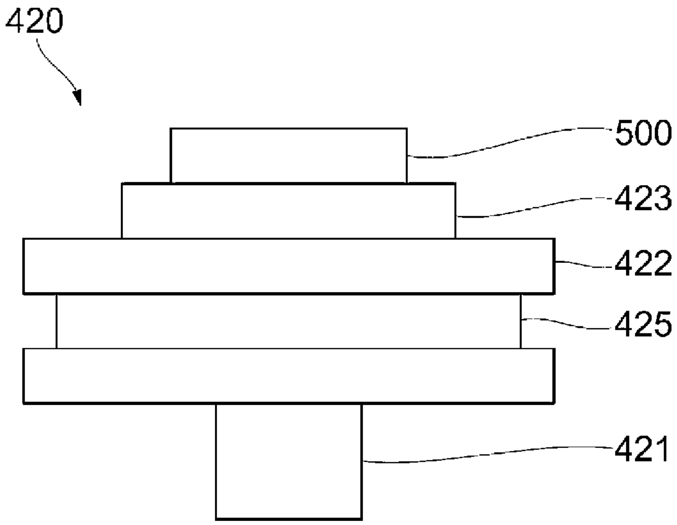

FIGS. 5A and 5B illustrate a structure of the attachment table 420. FIG. 5A illustrates a first configuration example, and FIG. 5B illustrates a second configuration example. In the first configuration example illustrated in FIG. 5A, the table part 422 is supported on an upper surface of the leg part 421 with use of plural springs 424. The springs 424 are compression springs, and are coiled springs in the example illustrated in FIG. 5A. When the attachment table 420 receives a pressure from an upper side, the springs 424 contract in accordance with the received pressure, and thereby the table part 422 sinks down. When the pressure from the upper side acting on the attachment table 420 decreases, the table part 422 is pushed up due to repulsion of the springs 424. The plural springs 424 are independent of one another and individually support the table part 422. Accordingly, the table part 422 is inclined depending on a position where a pressure is received instead of merely sinking down. The springs 424 are an example of the elastic body.

In the second configuration example illustrated in FIG. 5B, an elastic sheet 425 is provided between the table part 422 and the leg part 421. In a case where the sheet 425 is interposed between the table part 422 and the leg part 421, when the attachment table 420 receives a pressure from an upper side, the sheet 425 is crushed in accordance with the received pressure, and the table part 422 sinks down accordingly. When the pressure from the upper side acting on the attachment table 420 decreases, the table part 422 is pushed up due to elasticity of the sheet 425. The sheet 425 is partially crushed in accordance with a local pressure at and around a portion receiving the pressure. Accordingly, the table part 422 is inclined depending on a position where a pressure is received instead of merely sinking down. Although a single plate-shaped sheet 425 is illustrated in the example illustrated in FIG. 5B, plural sheets made of different materials may be laminated to obtain elasticity and flexibility suitable for supporting the table part 422. The sheet 425 is an example of the elastic member.

Figure 6A:
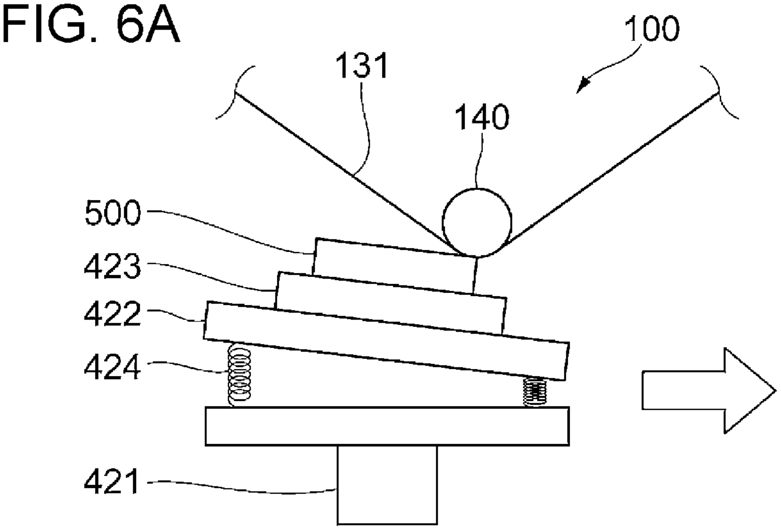
FIGS. 6A to 6C illustrate how a height of the attachment table changes when transfer is performed.
Figure 6B:
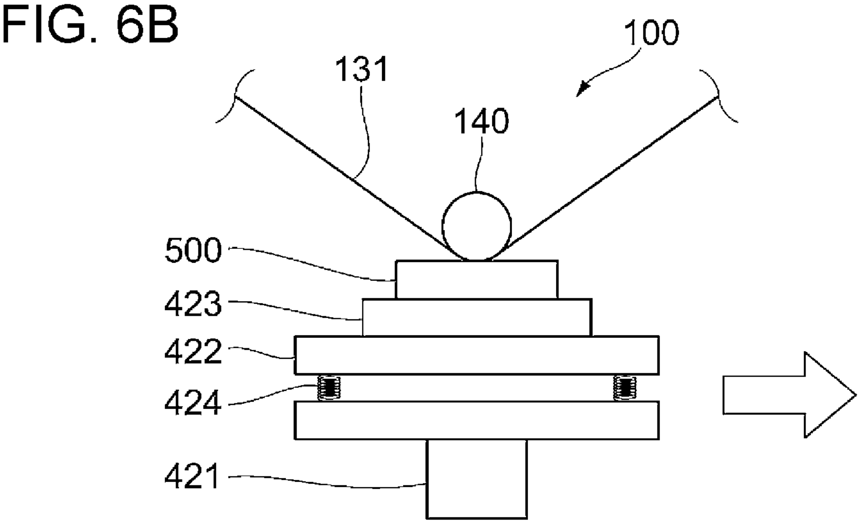
Figure 6C:
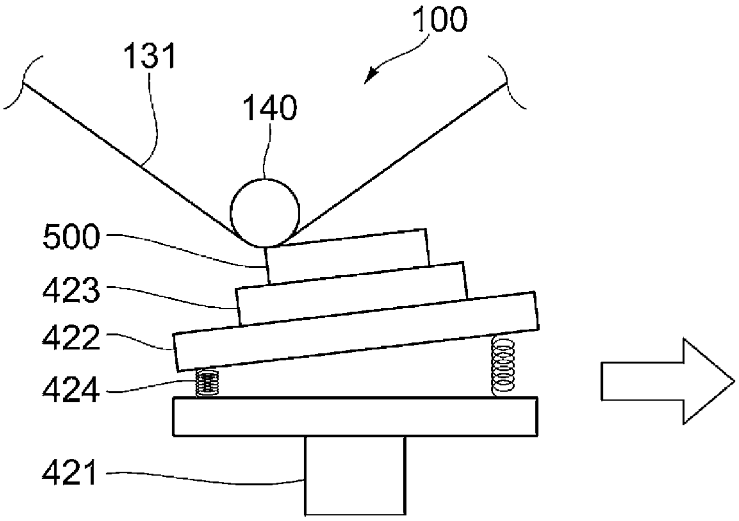

FIGS. 6A to 6C illustrate how the height of the attachment table 420 changes when transfer is performed. FIG. 6A illustrates a state at start of the transfer, FIG. 6 illustrates a state during the transfer, and FIG. 6C illustrates a state at end of the transfer. FIGS. 6A, 6B, and 6C illustrates an example in which the attachment table 420 in which the table part 422 is supported with the use of the springs 424 illustrated in FIG. 5A is used. In the example illustrated in FIGS. 6A, 6B, and 6C, a case where the transfer unit 100 transfers an image by making contact with the medium 500 as the attachment table 420 on which the medium 500 is placed moves from left to right (see the arrows) in FIGS. 6A, 6B, and 6C is illustrated.

At the start of the transfer, first, a leading end portion of the medium 500 in the transport direction makes contact with the intermediate transfer belt 131 of the transfer unit 100. Since the position of the intermediate transfer belt 131 is fixed by the backup roll 140, a portion of the medium 500 with which the intermediate transfer belt 131 makes contact receives a downward pressure when the intermediate transfer belt 131 and the medium 500 make contact with each other. As a result, a front end side of the table part 422 of the attachment table 420 in the transport direction sinks down due to the springs 424, and the whole table part 422 is inclined, as illustrated in FIG. 6A.

When the transfer of the image onto the medium 500 proceeds, a position of contact of the medium 500 with the intermediate transfer belt 131 moves in a direction opposite to the transfer direction. Accordingly, as illustrated in FIG. 6B, the whole table part 422 of the attachment table 420 sinks down due to the springs 424. Then, at the end of the transfer, a rear end side of the table part 422 of the attachment table 420 in the transport direction sinks down, and the whole table part 422 is inclined, as illustrated in FIG. 6C.

The table part 422 of the attachment table 420 changes the height thereof while being inclined in accordance with force applied by contact between the transfer unit 100 and the medium 500 as described above, and thereby force by which the transfer unit 100 pushes the medium 500 when an image is transferred falls within a certain range. Furthermore, a shock caused when the transfer unit 100 makes contact with the medium 500 is lessened.

Example of Configuration of Jig 423

The image forming apparatus 10 according to the present exemplary embodiment attaches the medium 500 to the attachment table 420 by holding the medium 500 on the jig 423 configured according to a shape and a size of the medium 500 and attaching the jig 423 to the table part 422. The jig 423 holds the medium 500 by fastening at least a part of a portion of the medium 500 other than a surface onto which an image is to be transferred. The jig 423 may be any jig that stably attaches the medium 500 to the attachment table 420, and is configured in various manners in accordance with the shape and size of the medium 500. The jig 423 is described below by giving some specific examples.

Figure 7A:
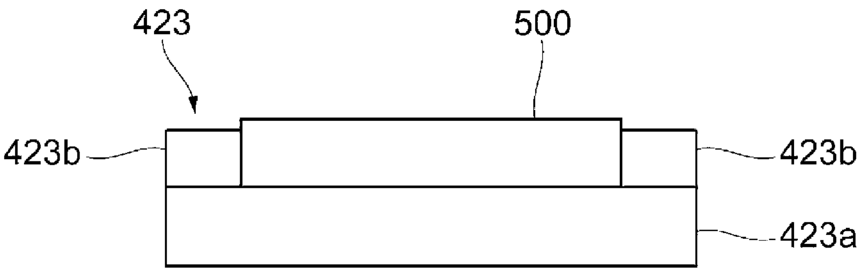
FIGS. 7A and 7B illustrate a first configuration example of a jig.
Figure 7B:
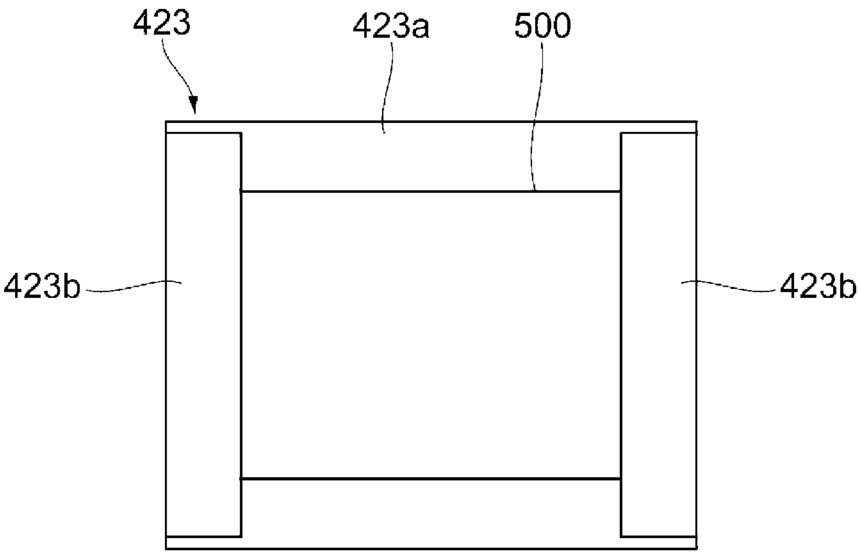

FIGS. 7A and 7B illustrate a first configuration example of the jig 423. Fig. A is a side view, and FIG. 7B is a plan view. The jig 423 includes a base plate 423*a* on which the medium 500 is placed and a fastening part 423*b* that fastens the medium 500 placed on the base plate 423*a*. The fastening part 423*b* is provided so as to fasten and fix the medium 500 at least from a front side in the transport direction in a state where the medium 500 is placed on the base plate 423*a*. In the configuration example illustrated in FIGS. 7A and 7B, the jig 423 fixes the medium 500 by fastening the medium 500 from front and rear sides in the transport direction (from left and right in FIGS. 7A and 7B). In this way, the position of the medium 500 is less likely to be shifted in the transport direction due to a shock caused by contact between the transfer unit 100 and the medium 500.

Furthermore, the fastening part 423*b* of the jig 423 has a specific height according to the height of the medium 500 placed on the base plate 423*a*. Since the table part 422 of the attachment table 420 floats up and sinks down as described with reference to FIGS. 5A and 5B and FIGS. 6A to 6C when an image is transferred onto the medium 500 by the transfer unit 100, the intermediate transfer belt 131 first makes contact with the fastening part 423*b* of the jig 423 on the front side in the transport direction and then makes contact with the medium 500. Accordingly, the height of the fastening part 423*b* is set to such a degree that a shock caused by contact of the transfer unit 100 does not affect an image formed on the intermediate transfer belt 131.

Figure 8A:
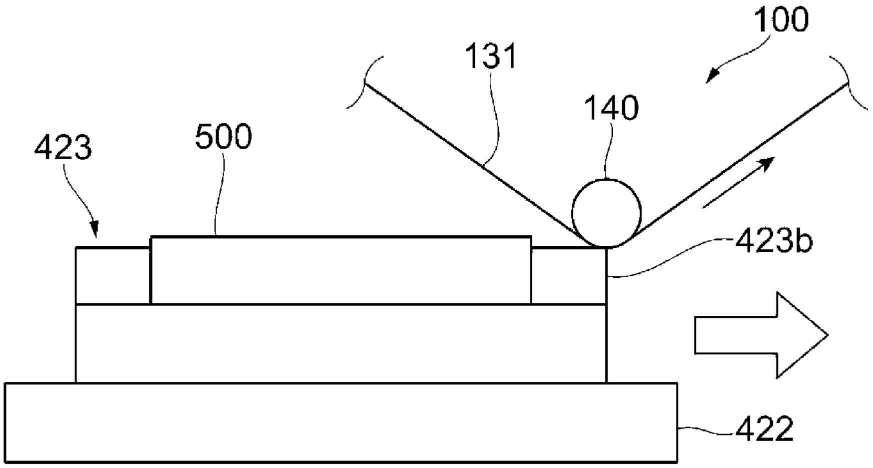
FIGS. 8A and 8B illustrate how the jig and a medium make contact with an intermediate transfer belt of the transfer unit at the start of transfer.
Figure 8B:
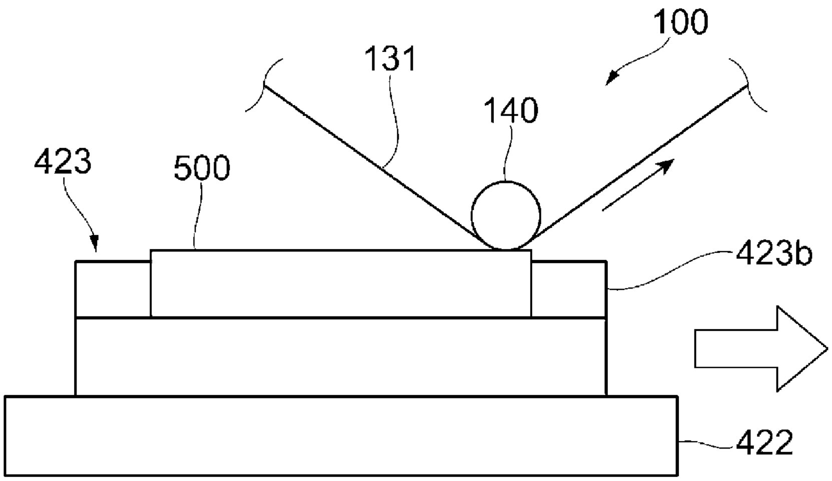

FIGS. 8A and 8B illustrate how the jig 423 and the medium 500 make contact with the intermediate transfer belt 131 of the transfer unit 100 at the start of transfer. FIG. 8A illustrates a state where the jig 423 and the intermediate transfer belt 131 are in contact with each other, and FIG. 8B illustrates a state where the medium 500 and the intermediate transfer belt 131 are in contact with each other. As illustrated in FIGS. 8A and 8B, when the jig 423 holding the medium 500 is attached to the table part 422 of the attachment table 420 and is transported, first, the fastening part 423*b* of the jig 423 on the front side in the transport direction makes contact with the intermediate transfer belt 131 (FIG. 8A). Then, when the attachment table 420 further moves, an end portion of the medium 500 on the front side in the transport direction makes contact with the intermediate transfer belt 131 (FIG. 8B), and transfer of an image starts. If a difference in height between the medium 500 and the fastening part 423*b* is large, a shock caused by the contact is large on both of the medium 500 and the intermediate transfer belt 131. In view of this, the difference in height between the medium 500 and the fastening part 423*b* is set equal to or less than a certain value. For example, an upper limit of the difference in height between the medium 500 and the fastening part 423*b* may be a smaller one of ½ of the height of the medium 500 and 3 mm.

Figure 9A:
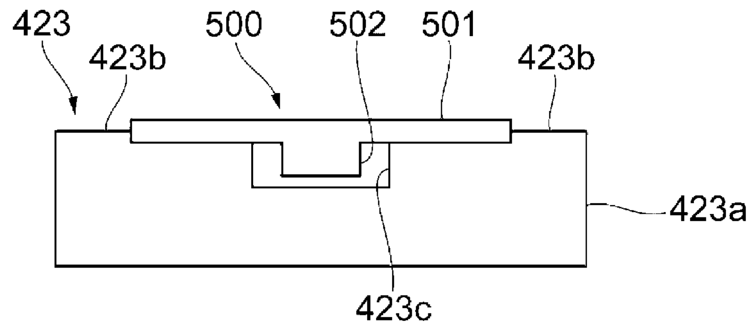
FIGS. 9A and 9B illustrate a second configuration example of the jig.
Figure 9B:
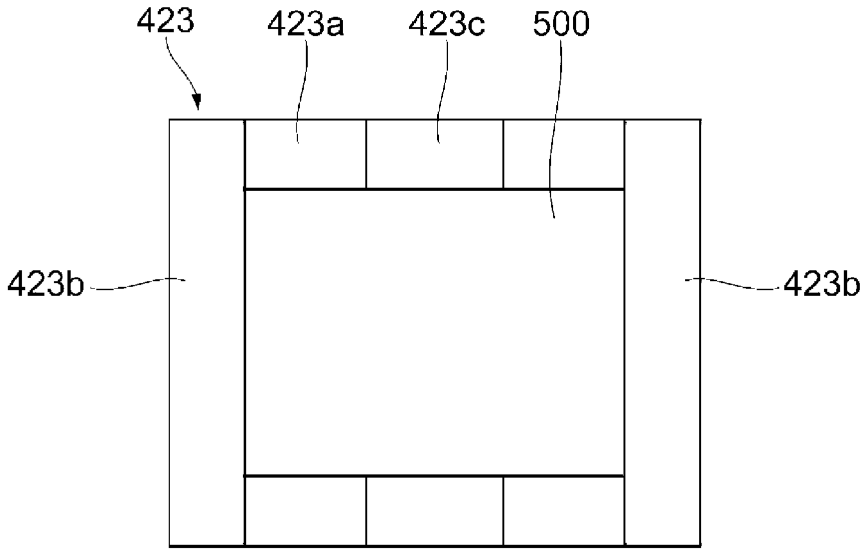

FIGS. 9A and 9B illustrate a second configuration example of the jig 423. FIG. 9A is a side view, and FIG. 9B is a plan view. In the example illustrated in FIGS. 9A and 9B, the medium 500 is a plate-shaped member and has a protruding portion on one surface side, and an image is formed on the other surface side. An example of such a medium 500 is a name tag having, on a rear surface thereof, an attachment part to be attached to clothes or the like. The jig 423 illustrated in FIGS. 9A and 9B has, on the base plate 423*a*, a groove 423*c* in which the protruding portion of the medium 500 is accommodated. Although a space for evacuation of the protruding portion on the one surface of the medium 500 is created by the groove 423*c* provided on the base plate 423*a* of the jig 423 in the example illustrated in FIGS. 9A and 9B, the protruding portion of the medium 500 may be fixed by the groove 423*c*. For example, the groove 423*c* may include a claw that is caught on the protruding portion of the medium 500 or a gripping unit that grips the protruding portion of the medium 500, and the medium 500 may be fixed to the jig 423 by fitting the protruding portion into the groove 423*c*.

Figure 10A:
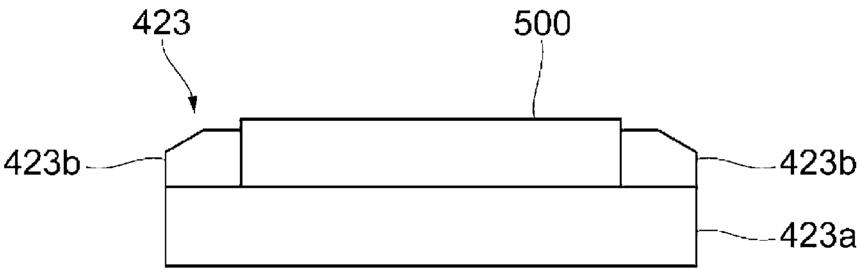
FIGS. 10A and 10B illustrate a third configuration example of the jig.
Figure 10B:
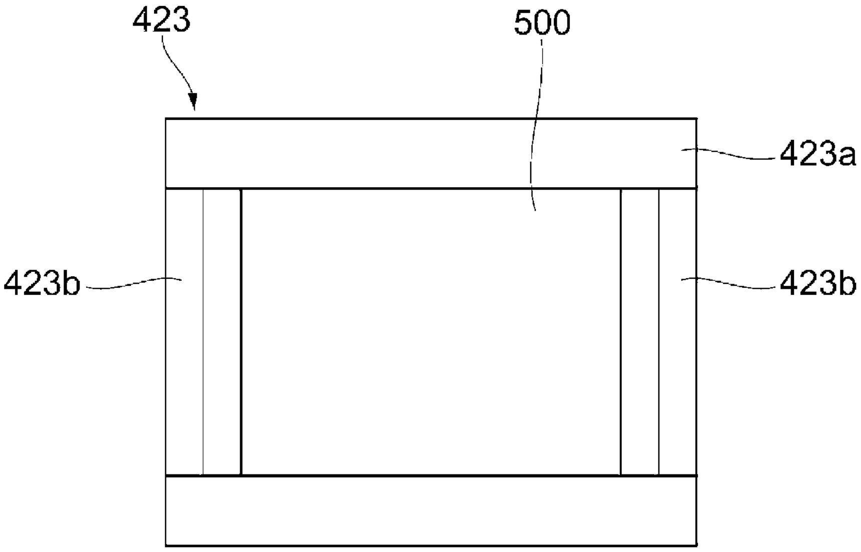

FIGS. 10A and 10B illustrate a third configuration example of the jig 423. FIG. 10A is a side view, and FIG. 10B is a plan view. In the example illustrated in FIGS. 10A and 10B, an end portion of the fastening part 423*b* on a side that does not make contact with the medium 500 is inclined. Specifically, the fastening part 423*b* of the jig 423 on the front side in the transport direction is inclined downward toward the front side in the transport direction, and the fastening part 423*b* of the jig 423 on the rear side in the transport direction is inclined downward toward the rear side in the transport direction. According to such a configuration, a shock caused when the fastening part 423*b* and the intermediate transfer belt 131 of the transfer unit 100 make contact is further lessened, as described with reference to FIG. 8A. Although both of the fastening part 423*b* on the front side and the fastening part 423*b* on the rear side of the medium 500 in the transport direction are inclined in the example illustrated in FIGS. 10A and 10B, it is only necessary that the fastening part 423*b* on the front side in the transport direction is inclined.

Figure 11A:
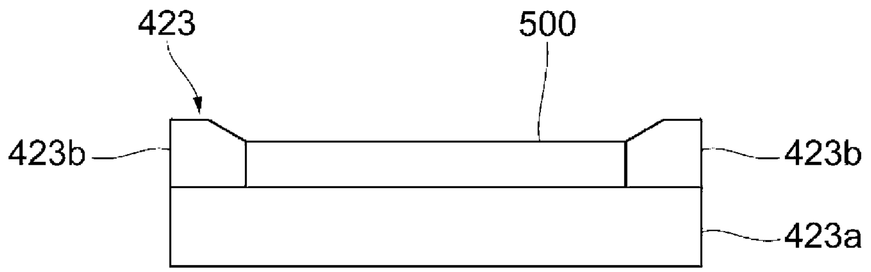
FIGS. 11A and 11B illustrate a fourth configuration example of the jig.
Figure 11B:
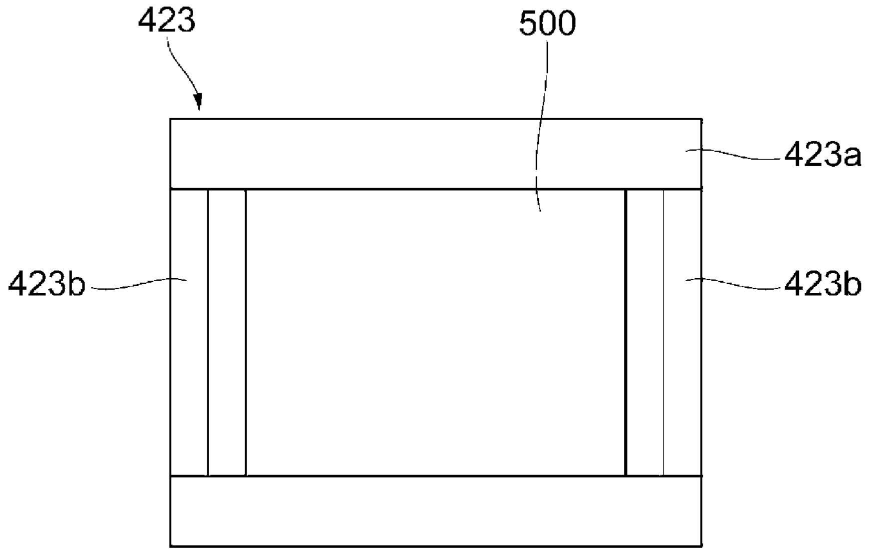

FIGS. 11A and 11B illustrate a fourth configuration example of the jig 423. FIG. 11A is a side view, and FIG. 11B is a plan view. In the example illustrated in FIGS. 11A and 11B, it is assumed that at least end portions of the medium 500 on the front side and the rear side in the transport direction cannot be exposed when an image is transferred. In this case, one option is to hold the medium 500 by the jig 423 having the fastening parts 423*b* whose height is equal to or higher than a height of the end portions of the medium 500, as illustrated in FIGS. 11A and 11B. The image forming apparatus 10 according to the present exemplary embodiment can transfer an image even in a case where the height of the fastening parts 423*b* is higher than the height of the end portions of the medium 500 as illustrated in FIGS. 11A and 11B since the table part 422 of the attachment table 420 floats up and sinks down as described with reference to FIGS. 5A and 5B and FIGS. 6A to 6C.

Figure 12A:
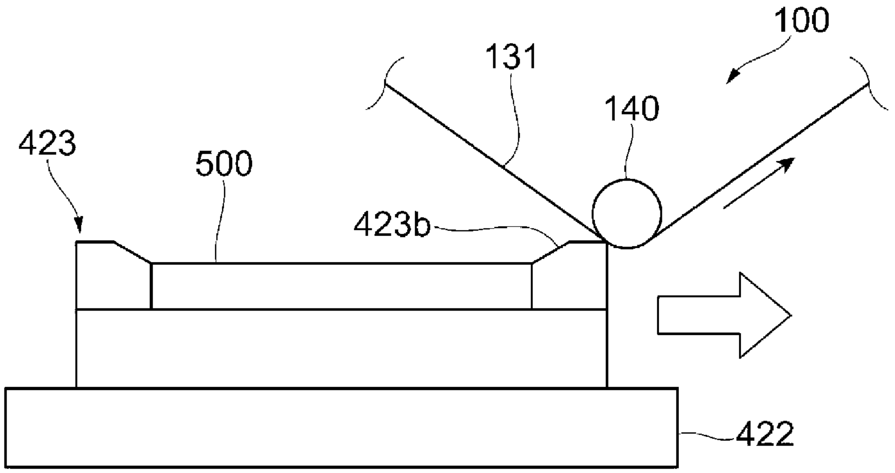
FIGS. 12A and 12B illustrate how the jig and the medium make contact with the intermediate transfer belt of the transfer unit in a case where the jig according to the fourth configuration example is used.
Figure 12B:
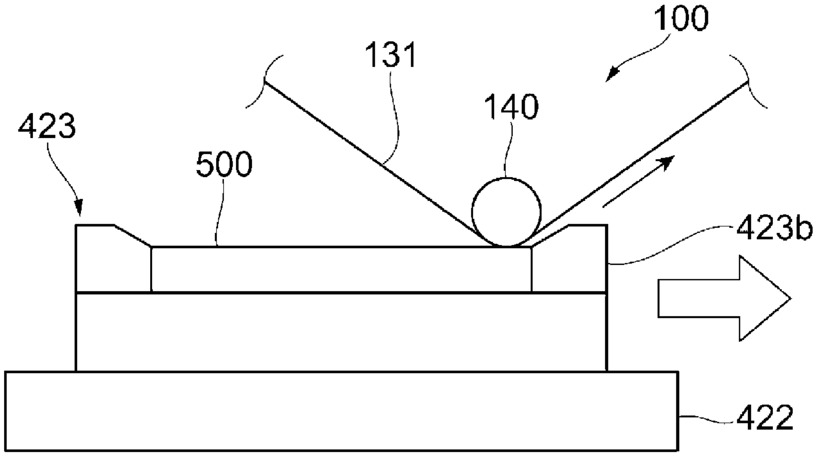

FIGS. 12A and 12B illustrate how the jig 423 and the medium 500 make contact with the intermediate transfer belt 131 of the transfer unit 100 in a case where the jig 423 according to the fourth configuration example is used. FIG. 12A illustrates a state where the jig 423 and the intermediate transfer belt 131 are in contact with each other, and FIG. 12B illustrates a state where the medium 500 and the intermediate transfer belt 131 are in contact with each other. As illustrated in FIGS. 12A and 12B, when the jig 423 holding the medium 500 is attached to the table part 422 of the attachment table 420 and is transported, first, the fastening part 423*b* of the jig 423 on the front side in the transport direction makes contact with the intermediate transfer belt 131 (FIG. 12A). Then, when the attachment table 420 further moves, the medium 500 makes contact with the intermediate transfer belt 131 (FIG. 12B), and transfer of an image starts. Since the table part 422 of the attachment table 420 is pushed up due to repulsive force of the springs 424 or the sheet 425 described with reference to FIGS. 5 and 6, even the medium 500 whose height is lower than the fastening part 423*b* of the jig 423 makes contact with the intermediate transfer belt 131.

Also in the example illustrated in FIGS. 12A and 12B, if a difference in height between the medium 500 and the fastening part 423*b* is large, a shock caused when the medium 500 and the intermediate transfer belt 131 make contact with each other is large although the shock is not as large as that in the example described with reference to FIGS. 8A and 8B. In view of this, the difference in height between the medium 500 and the fastening part 423*b* is set equal to or smaller than a certain value. For example, an upper limit of the difference in height between the medium 500 and the fastening part 423*b* may be a smaller one of ½ of the height of the medium 500 and 3 mm. Furthermore, in the example illustrated in FIGS. 12A and 12B, an end portion of the fastening part 423*b* of the jig 423 on a side that makes contact with the medium 500 is inclined. With this configuration, a shock caused when the fastening part 423*b* and the medium 500 make contact with each other is further lessened.

Example of Attachment Structure of Jig 423

Although the jig 423 can have shapes corresponding to the individual media 500, a uniform attachment structure is employed for attachment to the table part 422 of the attachment table 420. This makes it possible to attach the media 500 having various shapes and sizes to the attachment table 420 by interposing the jig 423 therebetween. The attachment structure of the jig 423 is not limited in particular, as long as the attachment structure is a structure that positions and fixes the jig 423 on the table part 422. As an example, one or both of the table part 422 and the jig 423 may be provided with a fastener or the like so as to be engaged with each other and fixed. The following describes the attachment structure of the jig 423 using a fastener by giving some specific examples.

Figure 13A:
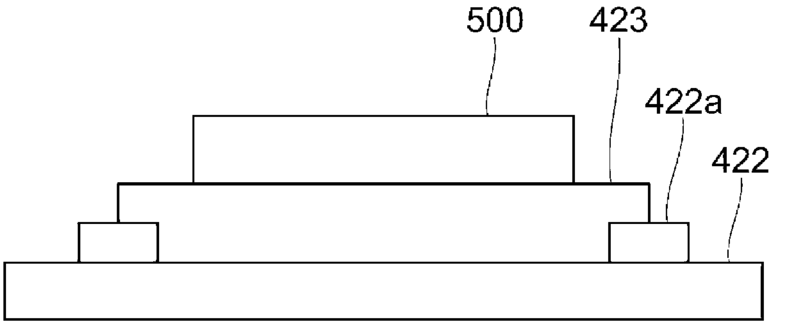
FIGS. 13A and 13B illustrate an example of a fastener that attaches the jig to the table part of the attachment table.
Figure 13B:
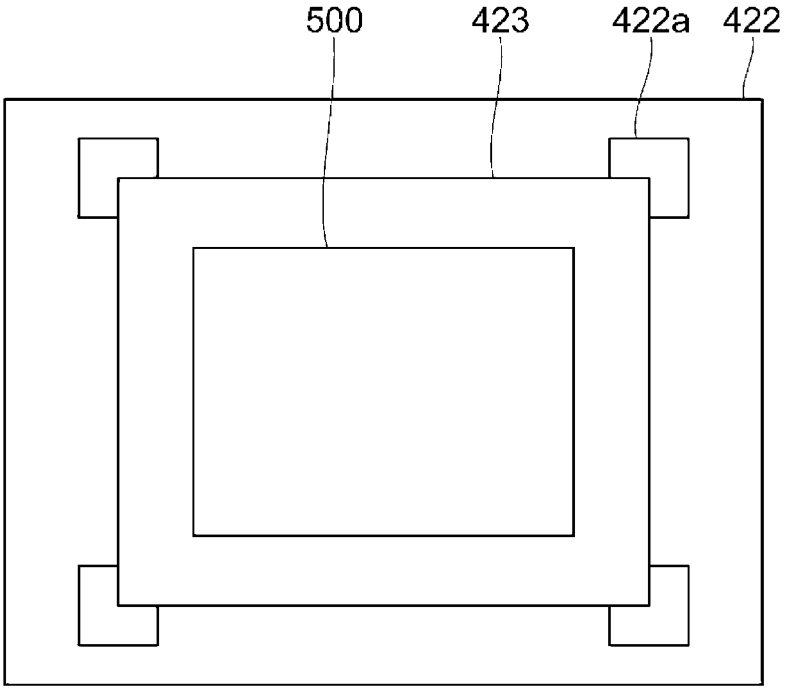

FIGS. 13A and 13B illustrate an example of a fastener that attaches the jig 423 to the table part 422 of the attachment table 420. FIG. 13A is a side view, and FIG. 13B is a plan view. In the example illustrated in FIGS. 13A and 13B, a butting part 422*a* that fastens an outer periphery of the jig 423 is provided as the fastener on the table part 422. In this example, it is assumed that an external shape of the jig 423 is rectangular. The butting part 422*a* stands on an upper surface of the table part 422 at positions corresponding to four corners of the jig 423 in a state where the jig 423 is placed on the table part 422. As illustrated in FIG. 13B, each of the butting parts 422*a* has an L shape that matches a corresponding corner of the jig 423. The four corners of the jig 423 are accommodated within these four butting parts 422*a*, and thereby the jig 423 is positioned on the table part 422, and movement of the jig 423 in a direction parallel with the surface of the table part 422 is regulated. In a case where the jig 423 is attached to the table part 422, the jig 423 is placed from above the table part 422 while adjusting positions of the corners of the jig 423 so that the jig 423 is accommodated within the four butting parts 422*a*.

Although the butting parts 422*a* are disposed corresponding to the four corners of the jig 423 in the example illustrated in FIGS. 13A and 13B, layout of the butting parts 422*a* is not limited to the example illustrated in FIGS. 13A and 13B as long as the jig 423 is positioned and movement thereof is regulated. For example, plate-shaped butting parts 422*a* may be disposed at positions corresponding to four sides of the jig 423 in a state where the jig 423 is placed on the table part 422. Even in a case where the external shape of the jig 423 is a shape other than a rectangular shape, the jig 423 can be attached to the table part 422 by disposing the butting parts 422*a* in accordance with the shape.

Figure 14A:
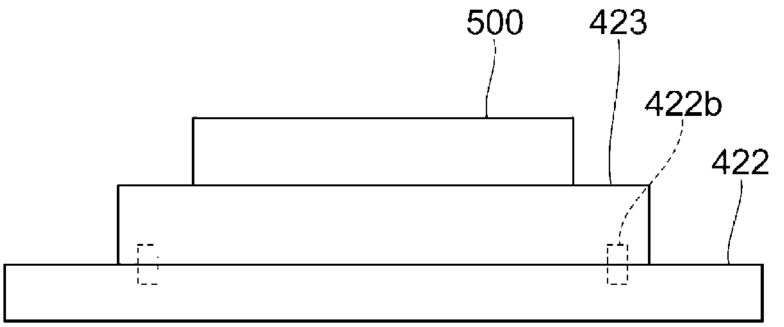
FIGS. 14A and 14B illustrate another example of a fastener that attaches the jig to the table part of the attachment table.
Figure 14B:
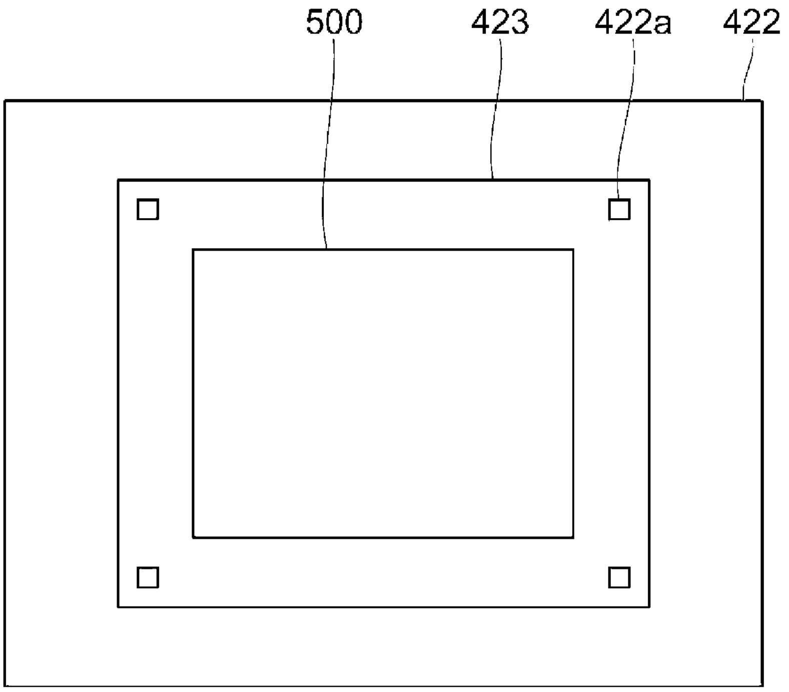

FIGS. 14A and 14B illustrate another example of a fastener that attaches the jig 423 to the table part 422 of the attachment table 420. FIG. 14A is a side view, and FIG. 14B is a plan view. In the example illustrated in FIGS. 14A and 14B, a pin 422*b* that connects the table part 422 and the jig 423 is provided as the fastener. In this example, a hole is provided at each of positions of the table part 422 and corresponding positions of the jig 423. One end side of the pin 422*b* is inserted into each of the holes of the table part 422, and the other end side of the pin 422*b* is inserted into a corresponding hole of the jig 423. In this way, the jig 423 is positioned on the table part 422, and movement thereof in a direction parallel with the surface of the table part 422 is regulated. In a case where the jig 423 is attached to the table part 422, the pin 422*b* is inserted into each of the holes of the table part 422, and the jig 423 is placed on the table part 422 while adjusting the positions of the holes of the jig 423 to the positions of the pins 422*b*.

In the example illustrated in FIGS. 14A and 14B, holes are provided in both of the table part 422 and the jig 423, and the pins 422*b* are inserted into the holes. Alternatively, it is also possible to employ a configuration in which a protruding pin 422*b* is provided on the upper surface of the table part 422 and the pin 422*b* is inserted into a hole formed in the jig 423 corresponding to the position of the pin 422*b*. Conversely, it is also possible to employ a configuration in which a protruding pin 422*b* is provided on a lower surface of the jig 423 and the pin 422*b* is inserted into a hole formed in the table part 422 corresponding to the position of the pin 422*b*. Although the pins 422*b* and holes are disposed so that the four pins 422*b* form four vertexes of a rectangle in the example illustrated in FIGS. 14A and 14B, layout of the pins 422*b* is not limited to the example illustrated in FIGS. 14A and 14B, as long as the jig 423 is positioned and movement thereof is regulated. In a case where the pins 422*b* are used as the fastener, the external shape of the jig 423 is not restricted since the outer peripheral part of the jig 423 is not fastened unlike the butting parts 422*a* described with reference to FIGS. 13A and 13B.

Figure 15A:
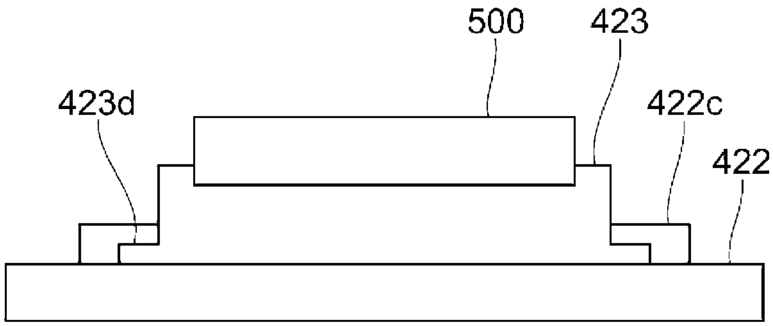
FIGS. 15A and 15B illustrate another example of the fastener that attaches the jig to the table part of the attachment table.
Figure 15B:
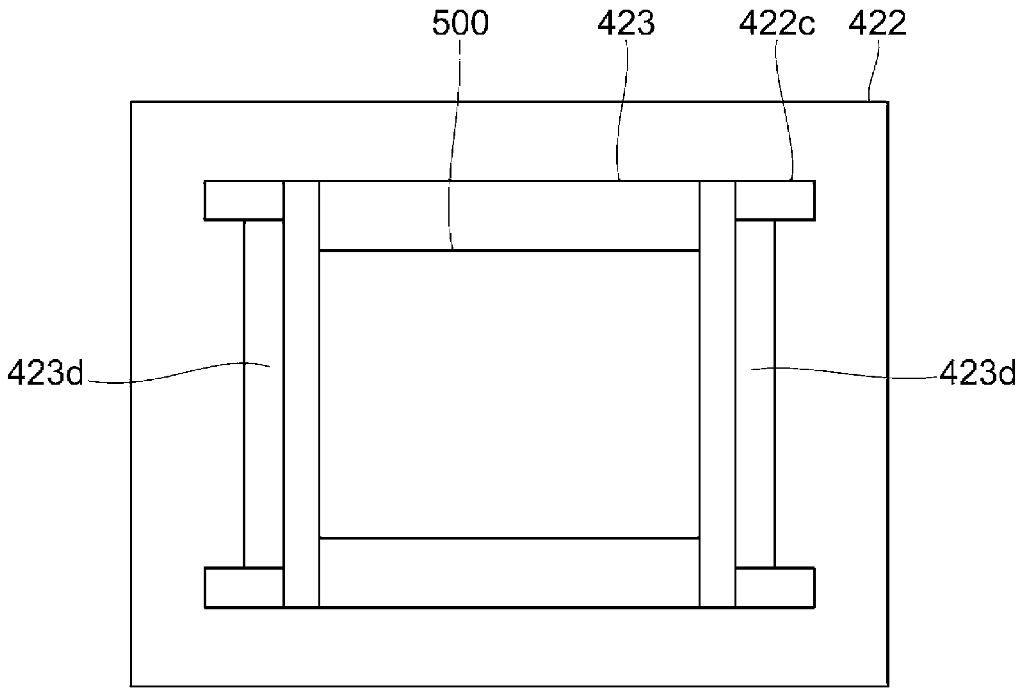

FIGS. 15A and 15B illustrate another example of the fastener that attaches the jig 423 to the table part 422 of the attachment table 420. FIG. 15A is a side view, and FIG. 15B is a plan view. In the example illustrated in FIGS. 15A and 15B, a claw 422*c* that is caught on the outer peripheral part of the jig 423 is provided as the fastener on the table part 422. In this example, it is assumed that the external shape of the jig 423 is rectangular. The jig 423 has, on a front side and a rear side in the transport direction on the outer circumference of the jig 423, a protruding side 423*d* on which the claw 422*c* is caught. The claw 422*c* is located so as to fasten the protruding side 423*d* of the jig 423 from the front and rear sides in the transport direction in a state where the jig 423 is placed on the table part 422. The claws 422*c* are configured to open upward in sync with one another or individually. By placing the jig 423 on the table part 422 and then closing the claws 422*c*, the jig 423 is positioned on the table part 422, and movement of the jig 423 in the transport direction and in an upward direction is regulated.

Although the claws 422*c* fasten the jig 423 from the front and rear sides in the transport direction in the example illustrated in FIGS. 15A and 15B, a claw 422*c* that fastens the jig 423 from a direction crossing the transport direction may be additionally provided. Furthermore, although the protruding side 423*d* of the jig 423 is provided throughout sides of the jig 423 on the front and rear sides in the transport direction in the example illustrated in FIGS. 15A and 15B, the protruding side 423*d* may be provided only at positions fastened by the claws 422*c*.

Although the exemplary embodiment of the present disclosure has been described above, the technical scope of the present disclosure is not limited to the above exemplary embodiment. For example, in the above exemplary embodiment, as for the elastic body used in the configuration for floating up and sinking down the table part 422 of the attachment table 420, an example in which coiled springs are used as the springs 424 has been illustrated in FIGS. 5A and FIGS. 6A to 6C. However, the type of springs is not limited as long as the plural springs 424 independently support the table part 422 with certain repulsive force. Instead of the coiled springs illustrated in FIGS. 5A and FIGS. 6A to 6C, plate springs, disc springs, or the like may be used. Alternatively, plural small pieces of an elastic member such as rubber may be disposed instead of the springs 424 to support the table part 422. Furthermore, the shape of the jig 423 and the structure for attaching the jig 423 to the table part 422 of the attachment table 420 are not limited to the specific examples described with reference to the drawings. Various changes and substitution of the configurations are encompassed within the present disclosure without departing from the scope of the technical idea of the present disclosure.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

APPENDIX (((1)))

An image forming apparatus including a transfer unit that transfers an image onto an object by making contact with the object; an attachment table to which the object is attached and that changes a height thereof in accordance with force by which the transfer unit makes contact with the object; and a transport unit that transports the attachment table to which the object has been attached along a transport path.

(((2)))

The image forming apparatus according to (((1))), wherein the attachment table fixes the object at least in a transport direction in which the object is transported by the transport unit.

(((3)))

The image forming apparatus according to (((1))) or (((2))), further including a jig that fastens at least a part of a portion of the object other than a surface on which an image is to be transferred, wherein the attachment table includes a fastener that positions and fixes the jig.

(((4)))

The image forming apparatus according to (((3))), wherein the jig fastens the object at least from a front side in the transport direction in which the object is transported by the transport unit; and the transfer unit starts transfer of an image by making contact with the object after making contact with the jig before the start of the transfer of the image.

(((5)))

The image forming apparatus according to (((3))) or (((4))), wherein a portion of the jig located on the front side in the transport direction is inclined downward toward the front side in the transport direction.

(((6)))

The image forming apparatus according to any one of (((1))) to (((5))), wherein the attachment table changes the height thereof while being inclined in accordance with force applied when the transfer unit makes contact with the object.

(((7)))

The image forming apparatus according to any one of (((1))) to (((6))), wherein the attachment table includes a mobile part that is moved along the transport path by the transport unit and a table part on which the object is placed; and the table part is supported on the mobile part by elastic bodies independently at a plurality of positions.

(((8)))

The image forming apparatus according to any one of (((1))) to (((6))), wherein the attachment table includes a mobile part that is moved along the transport path by the transport unit, a table part on which the object is placed, and a plate-shaped elastic member sandwiched between the table part and the mobile part.

What is claimed is:

1. An image forming apparatus comprising:

a transfer unit that transfers an image onto an object by making contact with the object;

an attachment table including a table part to which the object is attached and that changes a height thereof in accordance with force by which the transfer unit makes contact with the object, wherein a part of the table part that sink down changes depending on a position on the object where the force is received; and a transport unit that transports the attachment table to which the object has been attached along a transport path, wherein the table part includes a first side and a second side opposite to the first side, and an inclination of the table part includes an orientation where the first side being horizontally lower than the second side based on the force being applied at the first side through the contact between the transfer unit and the object.

2. The image forming apparatus according to claim 1, wherein the attachment table fixes the object at least in a transport direction in which the object is transported by the transport unit.

3. The image forming apparatus according to claim 2, further comprising a jig that fastens at least a part of a portion of the object other than a surface on which an image is to be transferred, wherein the attachment table includes a fastener that positions and fixes the jig.

4. The image forming apparatus according to claim 3, wherein:

the jig fastens the object at least from a front side in the transport direction in which the object is transported by the transport unit; and the transfer unit starts transfer of an image by making contact with the object after making contact with the jig before the start of the transfer of the image.

5. The image forming apparatus according to claim 4, wherein:

a portion of the jig located on the front side in the transport direction is inclined downward toward the front side in the transport direction.

6. The image forming apparatus according to claim 1, wherein:

the attachment table further includes a mobile part that is moved along the transport path by the transport unit; and the table part is supported on the mobile part by elastic bodies independently at a plurality of positions.

7. The image forming apparatus according to claim 1, wherein:

the attachment table further includes a mobile part that is moved along the transport path by the transport unit and a plate-shaped elastic member sandwiched between the table part and the mobile part.

8. An image forming apparatus comprising:

transfer unit means for transferring an image onto an object by making contact with the object;

an attachment table including a table part to which the object is attached and that changes a height thereof in accordance with force by which the transfer means makes contact with the object, wherein a part of the table part that sink down changes depending on a position on the object where the force is received; and transport means for transporting the attachment table to which the object has been attached along a transport path, wherein the table part includes a first side and a second side opposite to the first side, and an inclination of the table part includes an orientation where the first side being horizontally lower than the second side based on the force being applied at the first side through the contact between the transfer unit means and the object.

* * * * *